Patented May 16, 1944

UNITED STATES PATENT OFFICE 2,349,091

STABILIZED POLYDIAZO-PHTHALO-CYANINES

Norman Hulton Haddock, Blackley, Manchester, England, assignor to Imperial Chemical Industries Limited, a corporation of Great Britain No Drawing. Original application May 19, 1942, Serial No. 443,668. Divided and this application May 19, 1942, Serial No. 443,669. In Great Britain May 25, 1939

9 Claims. (Cl. 260—140)

This invention deals with novel derivatives of phthalocyanine compounds, which may be designated generically as stabilized polydiazophthalocyanines.

It is an object of this invention to provide novel compounds of the phthalocyanine series, which may be useful in dyeing and printing textile fiber. Other and further important objects of this invention will appear as the description proceeds.

This application is a continuation-in-part of my copending applications Serial No. 335,871, filed May 17, 1940; and Serial No. 408,931, filed August 30, 1941; and is a division of my copending application, Serial No. 443,668, filed simultaneously herewith. The first of these applications has now matured into Patent No. 2,280,072, issued April 21, 1942.

In my parent applications I have described a novel method for producing metal-free and metallic tetra-amino-phthalocyanines. According to my said invention tetra-amino-phthalocyanines are prepared by reducing the corresponding tetra-nitro-phthalocyanines by the aid of special reducing agents such as sodium sulfide, sodium hydrogen sulfide, sodium disulfide, stannous chloride or sodium hydrosulfite.

As typical tetra-nitro-phthalocyanines which may be economically employed for this purpose, there were mentioned copper-tetra-(4)-nitro-phthalocyanine, copper-tetra-(3)-nitrophthalocyanine, mixtures of these; other metallic tetranitro-phthalocyanines for instance those of cobalt, nickel, aluminum, lead or magnesium; and also metal-free tetranitro-phthalocyanine.

The tetra-amines thus obtained, in good yield, were described as generally green in color and insoluble in water. They are turned blue by the action of acids, for example hydrochloric acid, seemingly owing to salt formation. When subjected to the action of nitrous acid, they are readily diazotized, and in this form are useful as intermediates, namely diazo components, in the preparation of coloring matters.

In a similar manner, phthalocyanines having three or two diazonium groups may be prepared by starting with the corresponding trinitro and dinitro-phthalocyanines. These in turn may be prepared by synthesizing phthalocyanines from the preferred metal, say copper or cobalt, on the one hand and from a mixture of phthalonitrile and nitrophthalonitrile (in molal ratio 1:3 or 2:2, respectively) on the other hand. (See for instance my copending application, Serial No. 390,912.) Also, by starting with a tetra-nitro-phthalocyanine and reducing to a tetra-amino compound but using then a limited quantity of nitrous acid, phthalocyanine compounds containing less than four diazo groups per molecule may be produced.

My present invention is concerned primarily with the problem of stabilizing these polydiazo phthalocyanine compounds, whereby to obtain the same in solid state or equally stable form suitable for handling in commerce.

It is known that aryl diazonium compounds may be converted into various derivatives, of varying degrees of stability, which however may be divided generally into two classes:

I. Compounds which, in neutral or acid aqueous solution, show the reactions of the diazonium ion directly upon solution. This group comprises—

(a) Diazo compounds stabilized by double-salt formation with inorganic compounds such as polyvalent metal halides or fluoroboric acid;
(b) Diazo compounds stabilized by reaction with aryl sulfonic acids, such as naphthalene-1,5-disulfonic acid.

II. Compounds which are stable in neutral or alkaline solution, but do not give a diazonium cation in aqueous solution except upon acidification of the solution. This group comprises—

(c) The isodiazotates or "nitrosamines";
(d) Diazoamino- and diazoimino-compounds having water-solubilizing groups.
(e) Diazosulfonates of the formula

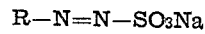

$$R-N=N-SO_3Na$$

(K. H. Saunders, The Aromatic Diazo Compounds and Their Technical Applications, London, 1936, page 30.)

The members of group II if dissolved in water in the absence of acid dissociate into alkalimetal cations, and anions which contain the aryl-diazo radical. Treatment with acid however, converts them in situ into a diazonium salt of the acid selected, which ionizes then into a diazonium cation and the anion of the selected acid.

The compounds of group I are sometimes referred to as "active" stabilized diazo-compounds, while those of group II are called "passive." (Saunders, ibid.) This application is primarily concerned with the said passive type of stabilization.

The present invention is based on the discovery that phthalocyanines having from 1 to 4 amino groups in their arylene nuclei, and obtainable by reduction of the corresponding nitrophthalocyanines, can be diazotized by treatment, in usual fashion, with agents forming nitrous acid, and that these diazonium compounds may be converted into derivatives of either of the above two types I and II.

This result was by no means readily foreseeable, inasmuch as we have found that the so-called amino-phthalocyanines prepared from amino-phthalic acid derivatives (for example by heating amino-phthalimide with urea and cuprous chloride), do not diazotize, and therefore cannot form the various stable polydiazonium compounds of this invention.

The diazotized amino-phthalocyanines have valuable affinity for cellulosic fiber. Their conversion derivatives of this invention are stable in solid form, and possess various degrees of stability when in solution. This invention therefore opens the field to a new series of phthalocyanine compounds which may be used in the arts of dyeing and printing cellulosic fiber.

For the sake of simplifying the discussion, the tetra-diazo compounds will be treated hereinafter as typical of the entire group, but it should be understood that my invention is not limited, and may be applied to any compound of the phthalocyanine series having from 1 to 4 diazo groups per molecule.

According to my invention, the tetradiazo compounds of the phthalocyanine series obtained above may be isolated in solid state by converting them into the corresponding alkali-metal-isodiazotates. The latter I have found can be made by the usual methods employed in converting aromatic diazonium salts into the corresponding isodiazotates. For example, the potassium tetra-(4)-iso-diazotate of copper phthalocyanine is prepared by adding a solution of the tetra-diazonium chloride to an excess of aqueous potassium hydroxide at —10° C. and then adding the mixture to a large volume of concentrated aqueous potassium hydroxide at not less than about 120° C.

Another method is to convert the tetradiazo compound into a tetra-diazoimino compound by treatment with a primary or secondary amine capable of forming diazoimino compounds with diazotized amines in general and possessing water-solubilizing groups (e. g. sulfo and carboxy groups), as typified by methyl-taurine, N-methyl-glycine and N-methyl-anthranilic acid.

Finally, the tetradiazo compound may be treated with sodium sulfite to convert it into a tetradiazo sulfonate.

I have found that the above stable derivatives of tetradiazo-phthalocyanines, possess valuable properties, and may be used as intermediates for the production of phthalocyanine azo dyestuffs either in substance or on the fiber.

Thus, they may be used for developing azo-colors upon cellulosic fiber which has first been padded, in usual fashion, with "ice-color" coupling components, such as β-naphthol or the arylides of 2,3-hydroxy-naphthoic acid. For example cotton cloth impregnated with an ice-color coupling component may be printed with a paste containing an isodiazotate or diazoamino compound of tetra-amino-copper-phthalocyanine. The coupling on the fiber is then effected by steaming in the presence of acid vapors, e. g. acetic or formic acid. Alternatively the coupling component may be incorporated into the printing paste. If a solution of the azotized aminophthalocyanine is desired, a sample of the isodiazotate, for example, may be stirred in cold concentrated hydrochloric acid to produce it. The diazosulfonates and diazoamino compounds, however, are not readily converted to solutions of the free diazo compounds.

Alternatively, the stable phthalocyanine-diazonium compounds of this invention may be applied to the fiber from aqueous bath, and then treated on the fiber with reagents and under conditions adapted to decompose the diazonium groups liberating nitrogen, producing on the fiber insoluble phthalocyanine derivatives. (See the copending application of Blackshaw and Haddock Serial No. 355,692 or the corresponding British Patent No. 535,935.) Green to blue shades of excellent fastness properties may thus be obtained. The developing substances selected for this purpose may be organic or inorganic compounds, and the vast field of applicable agents may be illustrated by the following: water, ethyl alcohol, potassium iodide, potassium bromide, potassium ethyl xanthate, sodium ethyl xanthate, pyridine, sodium stannite, sodium sulphite, sodium oleyl sulphate, potassium ferrocyanide, ammonia, sodium sulphide, formic acid, sodium thiosulphate, benzoquinone, hydrazine sulphate, potassium cyanate, sodium formate, sodium hypophosphite, sodium thiocyanate, sodium cuprocyanide and alkaline formaldehyde.

In the cases of the diazoaminos and diazosulfonates, due to their greater stability, the decomposition proceeds most rapidly and completely at higher temperatures, in the boiling point of the treating bath.

The dry, stabilized phthalocyanine diazonium compounds are green powders which are stable at ordinary temperature and can be stored for long periods out of contact with moisture. The diazo-amino compounds, the diazo-sulfonates and the isodiazotates are readily soluble in water.

The invention is illustrated but not limited by the following examples, in which the parts are by weight.

EXAMPLE 1—*Potassium isodiazotate*

30 parts of finely divided copper-tetra-(4)-amino-phthalocyanine (prepared as in Example 2 of my parent application, Serial No. 335,871), in the form of an aqueous paste, are mixed with 350 parts of water and 150 parts of concentrated aqueous hydrochloric acid (sp. gr. 1.16). To the mixture at 5° C. is added a solution of 15 parts of sodium nitrite in 50 parts of water. The temperature is maintained throughout at 5° C. or below. The dark green diazo solution is now added to a stirred mixture, at —10° C., of 1200 parts of potassium hydroxide and 800 parts of water. The green solution so obtained is added rapidly to a mixture of 1600 parts of potassium hydroxide and 400 parts of water previously heated to 120° C. The temperature is maintained at not less than 120° C. during the addition. The mixture is cooled to 100° C. and the tetra-isodiazotate, in suspension, is filtered off through asbestos paper. It is pressed under vacuum till dry. The product is a dark green powder soluble in cold water to give a bluish green solution.

Instead of potassium hydroxide, in the above example, equivalent quantities of sodium hydroxide may be employed. Instead of copper-tetra-(4)-amino-phthalocyanine as initial material, there may be employed the various polydiazonium compounds derived from cobalt- or nickel-tetra-(4)-amino-phthalocyanine; from copper-, cobalt-, or nickel-tetra-(3)amino-phthalocyanine; from copper-, cobalt- or nickel tri-(3)- and tri-(4)-amino-phthalocyanine; and from the corresponding metal-free tetra- and tri-amino-phthalocyanines.

The products of this example may be applied most advantageously by printing on cotton cloth in the form of an alkaline, thickened printing paste. Said prints may be after-treated to decompose the isodiazotate by steaming under acid conditions (e. g. acetic, formic acid), or by boiling with aqueous solutions of the reagents indicated in copending application of Blackshaw and Haddock Serial No. 355,692, or with dilute aqueous acids or acid salts. The paste may be printed on cloth, which has been impregnated with an alkaline solution of an azoic coupling component, such as an arylide of beta-oxynaphthoic acid and dried. If this print is then steamed under acid conditions (e. g. acetic, formic acid), coupling on the fiber takes place.

Furthermore, printing pastes may be prepared, which contain alkali, the isodiazotate of one of the various amino-phthalocyanines above mentioned, an ice-cooler coupling component and a thickener. Such pastes, when printed on cloth and steamed under acid conditions, or when passed into an aqueous bath containing weak acids (e. g. acetic acid) or acid salts (e. g. sodium bichromate), form the dye on the fiber and yield green to brown prints.

Dyeings by one or the other of the methods disclosed in copending application of Blackshaw and Haddock Serial No. 355,692 (later replaced by copending applications Ser. Nos. 444,106 and 444,107 of the same inventors), may be made by treating these isodiazotates in the cold with aqueous acid (e. g. concentrated hydrochloric acid), which decomposes the isodiazotate and yields an aqueous solution of the normal diazonium compound.

EXAMPLE 2.—*Diazoimino compound*

30 parts of copper-tetra-(4)-amino-phthalocyanine are azotized as described in Example 1. This deep-green solution obtained is added slowly with stirring to a solution containing 17 parts of N-methyl-glycine and 650 parts of sodium carbonate in 9500 parts of water at 0–5° C. After stirring one hour, the product is isolated by salting with about 900 parts of sodium chloride, filtering and drying. The product is soluble in water and is very stable.

In lieu of the 17 parts of N-methyl-glycine in the above example, 28 parts of N-methyl-anthranilic acid or 27 parts of beta-(N-methylamino)-ethyl-sodium sulfonate may be used, with similar results.

Other amino compounds usable for the same purpose are pipecolinic acid, N-methyl glucamine, N-ethyl-5-sulfoanthranilic acid.

In lieu of the phthalocyanine compound specified as initial material in the above example, 30 parts of copper-tetra-(3)-amino-phthalocyanine, 40 parts of copper-tri-(4)-amino-phthalocyanine, 30 parts of nickel-tetra-(4)-amino-phthalocyanine, or an equivalent proportion of any other of the metallic and metal-free phthalocyanines named under Example 1, may be employed.

The products may be applied to the fiber by converting an aqueous alkaline solution thereof to a printing paste with a suitable thickener (such as gum tragacanth or starch) and printing on cotton cloth or cloth impregnated with an alkaline solution of a substantive ice-color coupling component, followed by an acid steaming in the known manner, soaping and drying. Alternatively an ice-color coupling component may be incorporated in the alkaline printing paste; the paste is then printed on cotton cloth, steamed under acid conditions, soaped and dried.

EXAMPLE 3.—*Diazo-sulfonate*

30 parts of copper-tetra-(4)-amino-phthalocyanine are azotized as described in Example 1. The deep-green solution obtained is added slowly with stirring to a solution of 650 parts of sodium carbonate and 21.6 parts of sodium bisulfite in 9500 parts of water at 0–5° C. After stirring two hours, the diazo-sulfonate is isolated by adding about 900 parts of sodium chloride, filtering, and drying. The product is soluble in water and very stable.

In lieu of the tetramino phthalocyanine compound above specified, any other of the tetra- and triamino-phthalocyanines listed under Example 1 may be employed in equivalent proportion (based on the number of amino groups).

The products thus obtained are water-soluble and stable. They may be used for printing cotton fabric in the same manner as outlined under Example 2.

It will be clear that by this invention a new series of compounds are brought into existence which are characterized by the valuable shades and light-fastness of the phthalocyanine series of compounds; by their affinity for cotton fiber; and by their capacity to be applied thereto from aqueous solution or from a thickened aqueous printing paste.

As many apparently widely different embodiments of this invention may be made without departing from the spirit and scope thereof, it is to be understood that I do not limit myself to specific embodiments except as defined in the appended claims.

I claim:

1. A stabilized derivative of a polydiazonium compound of the phthalocyanine series, formed by reaction with a member of the group consisting of strong alkalis, amines containing water-solubilizing groups and capable of forming diazoamino compounds, and sodium bisulfite; said derivative being characterized by its solubility in water without forming therein a diazonium cation.

2. A compound of the general formula

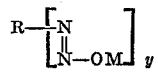

wherein R designates the radical of a phthalocyanine compound, M is an alkali-metal and $y$ is an integer not greater than 4.

3. A compound of the general formula

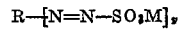

wherein R designates the radical of a phthalocyanine compound, M is an alkali-metal and $y$ is an integer not greater than 4.

4. A compound of the general formula

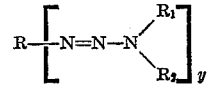

wherein R designates the radical of a phthalocyanine compound, the group

jointly represents the radical of a primary or secondary amine containing water-solubilizing groups, while $y$ stands for an integer not greater than 4.

5. A compound of the general formula

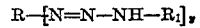

wherein R designates the radical of a phthalocyanine compound, R₁ designates an organic radical containing a water-solubilizing group, while $y$ stands for an integer not greater than 4.

6. A tetra-diazonium derivative of the phthalocyanine series, stabilized in solid form by conversion into the corresponding alkali-isodiazotate form.

7. The potassium isodiazotate of tetra-diazonium copper-phthalocyanine.

8. A process of isolating a poly-diazo-phthalocyanine in solid form, which comprises treating the same with an alkali-metal hydroxide to form the corresponding poly-isodiazotate.

9. A process of isolating copper-tetra-diazo-phthalocyanine in solid form, which comprises treating the same with potassium hydroxide to form the corresponding tetra-potassium isodiazotate.

NORMAN HULTON HADDOCK.

CERTIFICATE OF CORRECTION.

Patent No. 2,349,091.                                                May 16, 1944.

NORMAN HULTON HADDOCK.

It is hereby certified that error appears in the printed specification of the above numbered patent requiring correction as follows: Page 3, first column, line 15, for the words "ice-cooler" read --ice-color--; line 38, for "N-methyl-glycerine" read --N-methyl-glycine--; and that the said Letters Patent should be read with this correction therein that the same may conform to the record of the case in the Patent Office.

Signed and sealed this 29th day of August, A. D. 1944.

Leslie Frazer (Seal)                                                Acting Commissioner of Patents.